(12) United States Patent
Prud'Homme-Lacroix et al.

(10) Patent No.: US 9,365,289 B2
(45) Date of Patent: Jun. 14, 2016

(54) ROTORCRAFT FITTED WITH AN ANTI-TORQUE TAIL ROTOR THAT CONTRIBUTES SELECTIVELY TO PROVIDING THE ROTORCRAFT WITH LIFT AND WITH PROPULSION IN TRANSLATION

(71) Applicant: AIRBUS HELICOPTERS, Marignane, Cedex (FR)

(72) Inventors: Pierre Prud'Homme-Lacroix, Vitrolles (FR); Olivier Bistuer, La Fare les Oliviers (FR)

(73) Assignee: AIRBUS HELICOPTERS, Marignane (FR)

( * ) Notice: Subject to any disclaimer, the term of this patent is extended or adjusted under 35 U.S.C. 154(b) by 126 days.

(21) Appl. No.: 14/564,394

(22) Filed: Dec. 9, 2014

(65) Prior Publication Data

US 2015/0166175 A1    Jun. 18, 2015

(30) Foreign Application Priority Data

Dec. 17, 2013   (FR) ..................................... 13 02966

(51) Int. Cl.
*B64C 27/82* (2006.01)
*B64C 27/78* (2006.01)
(Continued)

(52) U.S. Cl.
CPC .................. *B64C 27/82* (2013.01); *B64C 27/52* (2013.01); *B64C 27/56* (2013.01); *B64C 27/59* (2013.01);
(Continued)

(58) Field of Classification Search
CPC ...... B64C 27/82; B64C 27/78; B64C 27/605; B64C 27/59; B64C 27/58; B64C 27/52; B64C 2027/8218; B64C 29/0033; B64C 29/0075
See application file for complete search history.

(56) References Cited

U.S. PATENT DOCUMENTS 2,604,949 A * 7/1952 McDonald .............. B64C 27/82
416/115
5,249,925 A 10/1993 Guimbal et al.
(Continued)

FOREIGN PATENT DOCUMENTS

FR    1484732    6/1967
FR    2969577    6/2012
(Continued)

OTHER PUBLICATIONS

French Search Report for FR 1302966, Completed by the French Patent Office on Aug. 8, 2014, 7 Pages.
(Continued)

*Primary Examiner* — Tien Dinh
*Assistant Examiner* — Richard R Green
(74) *Attorney, Agent, or Firm* — Brooks Kushman P.C.

(57) ABSTRACT

A rotorcraft provided with an anti-torque tail rotor having a drive axis of constant orientation and having a rotor disk that is arranged mainly to one side of the tail boom of the rotorcraft. A control mechanism for controlling the blades of the tail rotor includes a rotary control plate engaged with the blades and movable by a control rod extending along the drive axis of the tail rotor. The control plate is arranged in a constant mounting plane (PM) and serves to provide permanent cyclic variation in the pitch of the blades. Turning the control rod changes the way in which the cyclical variation of the pitch of the blades is operated between providing a contribution to lift and providing a contribution to propulsion in translation of the rotorcraft, depending on the angular orientation of the control plate in its mounting plane (PM).

11 Claims, 5 Drawing Sheets

(c)

(d)

(e)

(f)

(51) Int. Cl.
  *B64C 27/52* (2006.01)
  *B64C 27/56* (2006.01)
  *B64C 27/59* (2006.01)
  *B64C 27/605* (2006.01)

(52) U.S. Cl.
  CPC .............. *B64C 27/605* (2013.01); *B64C 27/78* (2013.01); *B64C 2027/8218* (2013.01); *B64C 2027/8281* (2013.01)

(56) References Cited

U.S. PATENT DOCUMENTS

| | | | | |
|---|---|---|---|---|
| 5,597,138 | A * | 1/1997 | Arlton | B64C 27/82 244/17.13 |
| 6,286,783 | B1 * | 9/2001 | Kuenkler | B64C 27/52 244/26 |
| 6,892,980 | B2 * | 5/2005 | Kawai | B64C 29/0033 244/12.4 |
| 8,579,226 | B2 * | 11/2013 | Deale | A63H 27/02 244/12.4 |
| 8,763,949 | B2 | 7/2014 | Thomassey | |
| 2006/0226281 | A1 * | 10/2006 | Walton | B64C 29/0033 244/17.23 |
| 2011/0211953 | A1 | 9/2011 | Stille | |
| 2012/0012693 | A1 | 1/2012 | Thomassey | |

FOREIGN PATENT DOCUMENTS

| | | |
|---|---|---|
| GB | 622837 | 5/1949 |
| GB | 2274634 | 8/1994 |
| JP | 05221389 A | 8/1993 |
| JP | 10505559 A | 6/1998 |

OTHER PUBLICATIONS

Japanese Notice of Reasons for Rejection Dated Feb. 26, 2016, Application No. 2014-254167, Reference No. E0303GP002, Mailing No. 087822, 2 Pages.

* cited by examiner

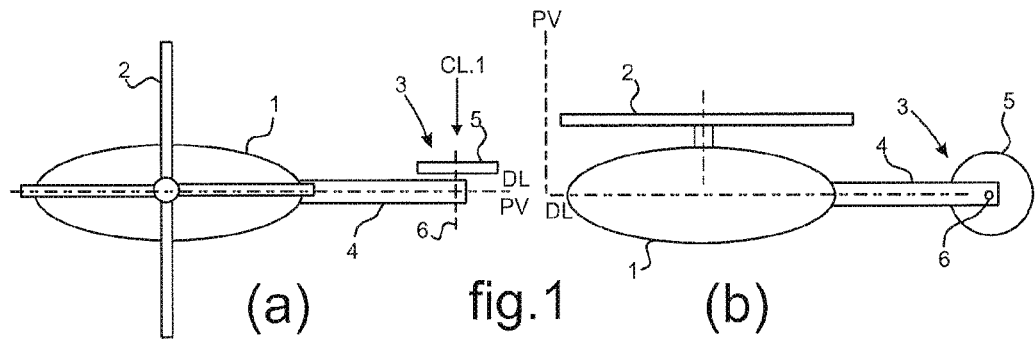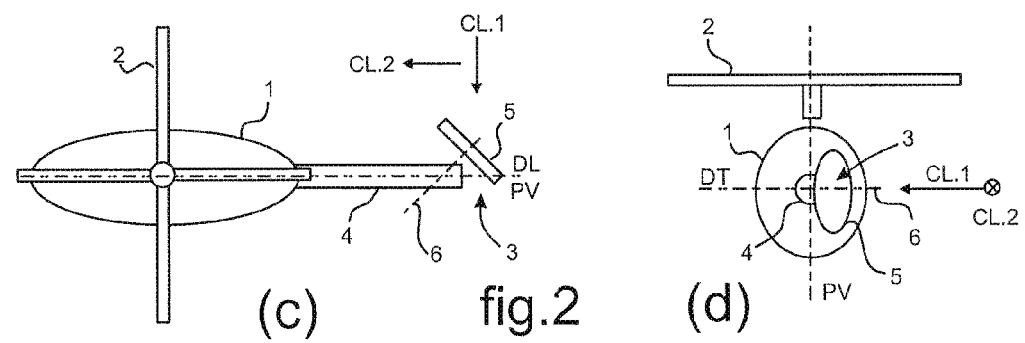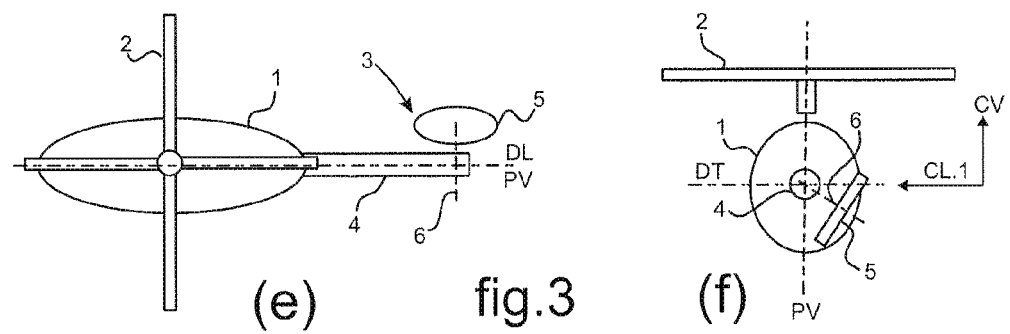

ROTORCRAFT FITTED WITH AN ANTI-TORQUE TAIL ROTOR THAT CONTRIBUTES SELECTIVELY TO PROVIDING THE ROTORCRAFT WITH LIFT AND WITH PROPULSION IN TRANSLATION

CROSS REFERENCE TO RELATED APPLICATION

This application claims priority to French patent application No. FR 13 02966 filed on Dec. 17, 2013, the disclosure of which is incorporated in its entirety by reference herein.

BACKGROUND OF THE INVENTION (1) Field of the Ivention

The present invention relates to the field of rotorcraft, and it relates more specifically to rotorcraft anti-torque rotors of rotary drive axis that is substantially horizontal. Typically, such an anti-torque rotor serves to stabilize and guide the rotorcraft in yaw, by countering the yaw torque generated by the main rotor of rotary drive axis that is substantially vertical and that serves to provide the rotorcraft at least with lift.

(2) Description of Related Art

The anti-torque rotor of the present invention is installed more particularly at the end of a tail boom of the rotorcraft. The rotor disk constituted by the rotary wing of said anti-torque rotor is oriented mainly vertically and longitudinally, being located laterally, i.e. on one side, of the tail boom of the rotorcraft, such that the anti-torque rotor generates a transverse thrust vector component that, in flight, provides yaw control of the rotorcraft.

The concepts of "lateral", or in other words "on one side", "transverse", and "vertical" are concepts that are commonly understood in the field of rotorcraft, being relative to the concept of "longitudinal", which is defined along the general direction in which the rotorcraft extends on the ground, which is typically considered as extending longitudinally from front to rear.

In general terms, rotorcraft rotors typically comprise a rotary wing made up of blades that are radially distributed around a hub. The hub is driven in rotation by a mechanical power transmission gearbox that is engaged with a power plant of the rotorcraft. While it is being driven in rotation, the rotary wing conventionally defines a rotor disk that extends between the tips of the blades driven in rotation by the hub.

With rotors, a distinction is typically drawn between the rotary drive axis of the rotor and the geometrical axis of rotation of the rotor. The rotary drive axis of the rotor is identified by the axis of rotation of the hub carrying the rotary wing, whereas the axis of rotation of the rotor corresponds to the geometrical axis of rotation of the rotor disk formed by the rotary wing of the rotor.

The blades are individually mounted on the hub via respective blade roots. The blade roots may be incorporated in the blades or they may be formed by mounting arms having the blades fitted thereto. Such a mounting arm may for example be arranged as a cuff or a sleeve.

A pilot of the rotorcraft can cause the blades of a rotorcraft rotor to pivot about respective pitch variation axes oriented along the general direction in which each blade extends. The blades are caused to pivot about their pitch variation axes by means of a blade control mechanism that can be actuated by a linkage operated by the pilot generating flight commands. Said pilot may be a human pilot or an autopilot.

In order to cause the blades to pivot about their pitch variation axes, each blade root is individually mounted to pivot on the hub, at least about the pitch variation axis of the blade. Each blade root has a pitch lever for individually engaging said control mechanism via a respective control link.

These arrangements are such that the pilot can vary the angle of incidence of the blades of the various rotors of a rotorcraft in order to modify the propulsion and/or the attitude in flight of the rotorcraft along the various directions in which it extends including the longitudinally-extending direction, the transversely-extending direction, and/or the vertically-extending direction.

Conventionally, rotorcraft have at least one main rotor with a rotary drive axis that is substantially vertical for the purpose of providing the rotorcraft at least with lift and/or with guidance in the vertically-extending direction of the rotorcraft.

In the specific configuration of helicopters, the main rotor not only provides the rotorcraft with lift, but also with propulsion in any direction of progression, and it enables the rotorcraft to change attitude in pitching and in roll.

For this purpose, the blades of the main rotor are movable by the pilot so as to pivot about their pitch variation axes. In order to modify the lift provided by the main rotor, the pilot generates flight commands that cause the pitch of the blades of the main rotor to vary collectively. In order to modify the attitude of the rotorcraft in pitching and/or in roll, the pilot generates flight commands that cause the pitch of the blades of the main rotor to vary cyclically.

With the main rotor, said mechanism for controlling the pitch of the blades about their pitch variation axes frequently comprises a swashplate mounted on a mast carrying the main rotor on its drive axis. The swashplate is made up of a bottom plate carrying a top plate that is superposed thereon and that lies on the same axis. The bottom plate is mounted to be stationary in rotation about the drive axis of the main rotor. The top plate is mounted to rotate about the drive axis of the main rotor, being put into engagement with the hub by means of a hinged structure, e.g. arranged as a scissors link.

Furthermore, the bottom plate is mounted to move relative to the mast in translation and in nutation. The bottom plate can be moved by the pilot by means of control links operating in response to three distinct flight control lines. The top plate is connected to each of the blade roots by control links respectively engaged with the pitch levers of each of the blade roots. Such an arrangement of the swashplate enables it to be moved axially while also being capable of oscillating in all directions like a ball joint, so as to cause the pitch of the blades to vary in compliance with the flight commands issued by the pilot.

These arrangements mean that the pilot can place the swashplate in any orientation in three dimensions relative to the mast. A movement of the swashplate in translation along the mast causes the pitch of the blades to vary collectively and serves to modify the lift produced by the main rotor, thus making it possible to vary the flight attitude of the rotorcraft in its vertically-extending direction. Tilting of the swashplate relative to the mast depending on the individual azimuth positions of the blades causes the pitch of the blades to vary cyclically and thus enables the flight attitude of the rotorcraft to be modified in pitching and/or in roll.

Proposals also have been made in Document US 2011/211953 (Brandon L. Stille) for a mechanism analogous to two plates for varying the pitch of the blades of a rotorcraft rotor. According to that document, the outer plate engaging the blades is arranged around an inner plate that is mounted to oscillate in its general plane. The two plates can be moved together in translation by a main rod for varying the pitch of the blades collectively. A secondary rod coaxial with the main rod enables the inner plate to be inclined and consequently enables the outer plate to be inclined relative to the axis of the rotor in order to vary the pitch of the blades cyclically.

Furthermore, rotorcraft are conventionally fitted with an anti-torque device providing the rotorcraft with stability in yaw by countering the yaw torque generated by the main rotor. Such an anti-torque device is also used for guiding the rotorcraft in yaw. Anti-torque devices of rotorcraft are frequently installed at the end of a tail boom of the rotorcraft. By way of example, an anti-torque device for a rotorcraft may be of the air-jet type, or more commonly it may be formed by a tail rotor having a rotary drive axis that is substantially horizontal.

With such a tail rotor, the rotor disk formed by the tail rotary wing is oriented mainly vertically and longitudinally, and in particular is arranged on one side of the tail boom of the rotorcraft. These arrangements are such that the tail rotor generates thrust that mainly comprises a transverse vector component for providing the rotorcraft with yaw control.

The stabilization and the guidance of the rotorcraft in yaw are controlled by causing the pitch of the blades of the tail rotor to vary collectively, thereby varying the magnitude of the thrust generated by the tail rotor. For this purpose, the tail rotor is fitted with a said control mechanism for varying the pitch of its blades about their pitch variation axes.

In a conventional embodiment, such a control mechanism for a tail rotor comprises a control rod mounted to move in translation relative to a structure for mounting the tail rotor on the tail boom. Such a structure is formed in particular by a mechanical power transmission gearbox that provides an angle takeoff to connect the tail rotor to a drive shaft extending orthogonally relative to the drive axis of the tail rotor.

The control rod extends inside the hub and it is mounted to be stationary in rotation. The control rod is movable in translation by means of a control link operated by the pilot using a control linkage for controlling the attitude of the rotorcraft in yaw.

A control plate is rotatably mounted on the control rod and it carries operating links engaged with respective levers fitted individually to the blade roots carrying the blades of the tail rotor. These arrangements are such that the pilot causing the control rod to move in translation leads to the pitch of the blades of the tail rotor being varied collectively.

Furthermore, the forces for pivotally moving the blades of the various rotors of a rotorcraft can be considerable, so it can be useful for the pilot to be assisted in delivering the forces for controlling the blades. For this purpose, it is common practice to use servo-controls placed on the various control linkages in order to cause the pitch of the blades in the various rotors to vary.

More particularly, servo-controls may provide a human pilot with assistance in delivering the forces that need to be delivered in order to vary the pitch of the blades by means of a power transmission mechanism. The servo-controls may also advantageously be controlled as a function of flight commands generated by an autopilot.

In this context, it has been found that use of the tail rotor can be optimized by using thrust from the tail rotor not only for stabilizing and guiding the rotorcraft in yaw, but also for contributing to providing it with propulsion in translation. More particularly, the tail rotor can be used not only for controlling the attitude of the rotorcraft in yaw, but also for forming a propeller for propelling the rotorcraft in translation.

Nevertheless, in order to provide such a propeller for propulsion in translation, the rotor disk formed by the rotary wing of the tail rotor needs to be oriented mainly vertically while being inclined relative to the orientation of the transversely-extending plane of the rotorcraft.

One known solution consists in swivel-mounting the tail rotor on the tail boom, such that the rotor disk can be oriented in various directions depending on the use that is being made of the tail rotor.

More particularly, the tail rotor may be swiveled between a position in which the rotor disk is in a longitudinal-vertical orientation and a position in which the rotor disk is in a transverse-vertical orientation.

In the longitudinal-vertical orientation position, the rotor disk is oriented vertically and longitudinally in the directions in which the rotorcraft extends vertically and longitudinally. In other words, in the longitudinal-vertical orientation position, the rotor disk is arranged substantially perpendicularly to the transversely-extending direction of the rotorcraft.

In the transverse-vertical orientation position, the rotor disk is oriented vertically, being at least inclined relative to the longitudinally-extending direction of the rotorcraft, or indeed being arranged perpendicularly relative thereto.

Those arrangements are such that when the rotor disk is positioned in the longitudinal-vertical orientation, the tail rotor is used solely for guiding and stabilizing the rotorcraft in yaw against the yaw torque generated by the main rotor. Swiveling the tail rotor so as to position the rotor disk in its transverse-vertical orientation then enables the thrust produced by the tail rotor to be used to contribute to propelling the rotorcraft in translation.

On this topic, reference may be made to Document FR 2 969 577 (Eurocopter), which describes such techniques for swiveling a tail rotor so that the rotor disk is steered selectively between a longitudinal-vertical orientation and a transverse-vertical orientation on either side of a neutral orientation.

Another known solution consists in permanently orienting the rotor disk formed by the rotary wing of the tail rotor in a longitudinal-vertical position that is more specifically oriented orthogonally relative to the longitudinally-extending direction of the rotorcraft, and then to cause the pitch of the blades to vary collectively and/or cyclically depending on requirements. On this topic, reference may be made to Document GB 622 837 (Firestone Tire & Rubber Co.) or to Document FR 1 484 732 (Dornier Werke Gmbh), which describe such ways of operating a tail rotor.

According to Document FR 1 484 732, the pitch of the blades is varied by operating a swashplate in the same manner as the swashplate conventionally used for varying the pitch of the blades of a main rotor. Collective variation of the pitch of the blades serves to vary the amplitude of the thrust produced by the tail rotor and thus makes it possible to adjust rotorcraft thrust in translation by means of the tail rotor. Stabilization and guidance of the rotorcraft are obtained by cyclical variation of the pitch of the blades of the tail rotor in association with making use of a rudder.

According to Document GB 622 837, a two-plate mechanism is mounted on a bushing surrounding the axis of rotation of a tail rotor. The two-plate mechanism comprises a rotary outer plate placed around an inner plate that does not rotate. The outer plate is engaged with the blades via a linkage for varying pitch by moving the outer plate axially. The inner plate is mounted to oscillate so that its angle of inclination, and consequently the angle of inclination of the outer plate, leads to cyclical variation in the pitch of the blades.

Another problem posed by rotorcraft rotors lies in flapping movements of the blades in the general plane of the rotor disk formed by the rotary wing.

For a tail rotor, reference may be made on this topic to Document GB 2 274 634 (Westland Helicopters), which proposes countering such flapping movements of the blades of a tail rotor by causing their pitch to vary cyclically.

According to GB 2 274 634, the control rod has a plate for controlling the blades in pivoting about their pitch variation axes. The control rod is mounted to turn together with the rotary wing on a tail rotor mounting structure at the end of a tail boom of the rotorcraft, being movable in translation along the drive axis of the tail rotor. In addition, the control rod has a ball joint hinge and is movable in nutation by means of an actuator in order to cause the control plate to be inclined and thereby in order to cause the pitch of the blades to vary cyclically on each rotation of the tail rotor.

Another use that is known for a tail rotor of a rotorcraft lies in providing the main rotor with assistance in providing lift. For this purpose, a tail rotor is provided at the end of the tail boom of a rotorcraft in such a manner that the rotor disk formed by its rotary wing is arranged in a longitudinal-sloping orientation. Such a longitudinal-sloping orientation is given to the rotor disk by mounting the tail rotor on the rotorcraft so that its drive axis is arranged in a manner that slopes significantly relative to the horizontally-extending plane of the rotorcraft.

In the longitudinal-sloping orientation position of the rotor disk, the tail rotor serves not only mainly to provide stabilization and guidance of the rotorcraft in yaw by means of a transverse thrust vector component, but also to provide additional lift by means of a vertical thrust vector component, making it possible to increase the range over which the center of gravity of the rotorcraft can be extended rearwards. The additional lift provided by the tail rotor is advantageous under specific flight situations, such as when transporting heavy loads and/or when the aircraft is hovering or flying at low speeds, which are commonly identified as being speeds less than 50 knots (kt).

Nevertheless, it has been found in practice that such additional lift can be harmful under certain flight situations of the rotorcraft, such as in particular when the rotorcraft is in a stage of flight at speeds faster than 75 kt.

In cruising flight, additional lift provided by the tail rotor provides an unfortunate increase in the attitude hump (effect of rotor wash on the stabilizer of the rotorcraft), degrades the stability of the rotorcraft, and leads to excessive fuel consumption. Consequently, continuous use of the tail rotor to provide additional lift is not appropriate, particularly when the rotorcraft is flying at cruising speeds, or indeed when the rotorcraft is not heavily loaded.

It can thus be seen that there has been continuous research in the field of rotorcraft concerning the organization of a tail rotor to provide not only control over the attitude of the rotorcraft in yaw, but also enabling the rotorcraft to be propelled in other directions, such as along the gravity axis in order to provide the rotorcraft with additional lift or along other directions so as to enable the rotorcraft to progress in translation.

Such research involves making choices concerning the uses to be made of the thrust generated by the tail rotor in order to provide on a priority or a subsidiary basis transverse thrust, vertical thrust, or horizontal thrust.

Nevertheless, a compromise needs to be found in such research between optimized use of the thrust provided by the tail rotor and simplicity in the structure of the tail rotor. It is important to avoid excessively complexifying the organization of the tail rotor, given that the advantages obtained are marginal compared with priority use of the tail rotor for controlling the attitude of the rotorcraft in yaw.

BRIEF SUMMARY OF THE INVENTION

An object of the present invention is to provide a rotorcraft fitted with a tail rotor having a rotary drive axis that is substantially horizontal to serve mainly to control the attitude of the rotorcraft in yaw, and in subsidiary manner to satisfy needs for thrust in at least one other direction relative to the rotorcraft.

In this context, it should not be forgotten that the above-mentioned compromise needs to be found. Furthermore, switching from making one use of the thrust generated by the tail rotor to another use needs to take place progressively and temporarily depending on requirements, while avoiding unbalancing the tail rotor and/or avoiding any risk of temporarily destabilizing the rotorcraft. It is also necessary to avoid excessively increasing weight at the end of the tail boom.

The rotorcraft of the present invention is fitted with at least one main rotor of substantially vertical rotary drive axis, and with an anti-torque tail rotor of substantially horizontal rotary drive axis. Said tail rotor is mounted at the end of a tail boom of the rotorcraft via a structure housing mechanical power transmission means between a hub of the tail rotor and a drive shaft of orientation that is transverse relative to said drive axis of the tail rotor.

Such a structure is conventionally constituted in particular by a mechanical power transmission gearbox interposed between the hub and the drive shaft which conventionally extends along the tail boom of the rotorcraft.

The drive axis of the tail rotor is arranged at a constant orientation that is substantially horizontal and orthogonal to the orientation of the vertical plane extending in the longitudinally-extending orientation of the rotorcraft.

These arrangements are such that the rotor disk constituted by the rotary wing of the tail rotor is arranged mainly in a longitudinal-vertical orientation (it should be recalled that the rotor disk is conventionally oriented vertically and longitudinally relative to the rotorcraft, conventionally being arranged on one side of the tail boom), such that the tail rotor essentially generates a transverse thrust vector component for controlling the yaw behavior of the rotorcraft.

Said hub carries said rotary wing made up of a plurality of blades individually mounted to be movable on the hub at least in pivoting about a pitch variation axis. The tail rotor is fitted with a control mechanism for pivoting the blades about their said pitch variation axes in compliance with pitch variation commands generated by a pilot of the rotorcraft.

It should be understood that the pilot of the rotorcraft may equally well be a human pilot or an autopilot, itself put into operation under the control of the human pilot.

Said control mechanism comprises a control plate rotatably engaged with the hub. The control plate is provided with control links for controlling the blades, the control links being engaged respectively with pitch levers individually fitted to the blades. The control plate is mounted to rotate on a control rod mounted coaxially about the drive axis of the tail rotor. The control rod is movable in translation along said axis by a first actuator operated under the control of control means in compliance with said pitch variation commands generated by a pilot of the rotorcraft.

Operation of the first actuator by the control means causes collective variation of the pitch of the blades of the tail rotor, thereby modifying the amplitude of the thrust generated by the tail rotor. The control mechanism further includes means for generating cyclical variation in the pitch of the blades of the tail rotor.

According to the present invention, the control plate is mounted on the control rod to generate permanent cyclical variation in the pitch of the blades of the tail rotor, the control plate being arranged with its general plane lying in a mounting plane of orientation that is constant relative to the drive axis of the tail rotor.

Furthermore, the control rod is turnable about the drive axis of the tail rotor by a second actuator operated under the control of the control means. The second actuator causes the control rod to turn between two predefined extreme positions causing a change in the angular orientation of the control plate in said mounting plane, and consequently modifies the orientation of said rotor disk.

These arrangements are such that the second actuator causing the control rod to turn towards a first extreme position causes the control plate to move in the mounting plane towards a first extreme angular orientation. With the control plate arranged in the first extreme angular orientation, the cyclical variation in the pitch of the blades of the tail rotor serves mainly to generate a thrust vector component that is vertical. Such a vertical thrust vector component is conventionally oriented in the vertically-extending orientation of the rotorcraft, and itself includes a vector component oriented along the gravity axis.

These arrangements are also such that the second actuator turning the control rod towards a second extreme position causes the control plate to move towards a second extreme angular orientation. With the control plate arranged in the second extreme angular position, the cyclic variation in the pitch of the blades of the tail rotor serves mainly to generate a thrust vector component that is longitudinal. Such a longitudinal thrust vector component is conventionally oriented in the longitudinally-extending orientation of the rotorcraft and provides the rotorcraft with thrust in translation along the plane in which it extends longitudinally.

Naturally, the respective amplitudes of the vertical thrust vector component and of the longitudinal thrust vector component are adjusted in opposite directions by moving the control plate between said extreme angular orientations.

It results from these arrangements that use of the control mechanism is governed by the control means so that the thrust generated by the tail rotor essentially provides control over the attitude of the rotorcraft in yaw and to a lesser extent and depending on needs provides a contribution to the lift of the rotorcraft and/or to propelling the rotorcraft in translation in its longitudinally-extending plane.

Furthermore, the contribution to the lift of the rotorcraft and the contribution to the propulsion in translation of the rotorcraft provided by the tail rotor may be favored selectively depending on distinct flight situations, these contributions being brought into operation progressively so as to better avoid unbalancing the flight of the rotorcraft during such a changeover.

The organization of the control mechanism is structurally simple, in particular it does not require any member of the control mechanism to be mounted to be movable in nutation, in the manner commonly used for causing the pitch of rotor blades to vary cyclically.

The mounting of the tail rotor on the tail boom is balanced around its drive axis, with the control rod being movable both in translation and in turning relative to the orientation of the drive axis of the tail rotor which is mounted in stationary manner to the tail boom. This avoids adding weight to the end of the tail boom and the tail rotor can be produced industrially at competitive cost.

The contribution to the lift of the rotorcraft provided by the tail rotor is not obtained in the conventional manner of mounting the tail rotor on the tail boom so that its drive axis is oriented in sloping manner relative to the orientation of the longitudinal plane in which the rotorcraft extends, but rather by means of the second actuator turning the control rod in a first direction.

Using the tail rotor to contribute in controlled manner to the lift of the rotorcraft makes it possible to avoid using a tilting horizontal stabilizer and serves to increase the operating margin for the rotorcraft on landing with respect to a tail skid conventionally fitted to the end of the tail boom touching the ground.

The contribution of the tail rotor to providing the rotorcraft with propulsion in translation is not obtained in the conventional manner of swivel-mounting the tail rotor on the tail boom of the rotorcraft so as to vary the orientation of its drive axis, but by the second actuator turning the control rod in a second direction opposite to the first direction.

The contribution to the lift of the rotorcraft as provided by the tail rotor may be favored under first flying situations in which such a contribution to the lift of the rotorcraft is advantageous, with a contribution to the propulsion in translation of the rotorcraft by the tail rotor then being advantageously significantly decreased in order to tend towards zero.

The first flying situations are identified in particular as a function of the weight of the load on board the rotorcraft and/or as a function of the center of gravity of the weight of the rotorcraft being offset rearwards, taking account in particular of payloads carried in a hold and/or by a sling, and/or as a function of the forward speed of the rotorcraft being identified as the aircraft progressing in hovering flight and/or at low speeds.

For example, it is particularly advantageous for the tail rotor to contribute to the lift of the rotorcraft while a rotorcraft that is carrying a heavy load is taking off and/or in the event of the rotorcraft hovering and/or flying at low speeds. Also by way of example, controlling the contribution to the lift of the rotorcraft as provided by the tail rotor makes it easier for the pilot to maintain the attitude of the rotorcraft and to manage the rearward offset of the center of gravity of the rotorcraft, in particular in the event of carrying payloads that are potentially of a variety of weights.

Likewise, the contribution to the propulsion in translation of the rotorcraft as provided by the tail rotor may be favored under second flying situations that are distinct from the first flying situations, in which said contribution to propulsion in translation is advantageous. The contribution of the tail rotor to providing the rotorcraft with lift is then advantageously significantly reduced or tends towards zero.

The second flying situations are identified in particular as being when the rotorcraft is moving at high speeds, at cruising speeds, which speeds are commonly accepted as being faster than 75 kt.

In one embodiment of the control plate, the control plate is mounted on the axis of the control rod, being arranged in a mounting plane that is oriented orthogonally relative to the transversely-extending vertical plane of the rotorcraft and that is inclined relative to the drive axis of the tail rotor. The control plate is movable between said extreme angular positions by being turned about the drive axis of the tail rotor.

The angle of inclination of the control plate relative to the drive axis of the tail rotor lies, by way of indication, in the range 10° to 30°.

By way of example, the control plate is mounted via at least one rolling bearing member on a collar of the control rod, which collar is inclined according to the mounting plane of the control plate.

In another embodiment of the control plate, the control plate is mounted on the control rod by being arranged in a mounting plane that is orthogonal to the drive axis of the tail rotor. The axis of rotation of the control plate is parallel to the drive axis of the tail rotor and is offset therefrom. The control plate is movable between said extreme angular orientations by angularly moving the control plate in said mounting plane about the drive axis of the tail rotor.

By way of example, the control plate is mounted via at least one rolling bearing member on a cylindrical finger carried radially at a distance from the drive axis of the tail rotor by means of a lug extending radially from the control rod.

By way of indication, the control rod is turnable by the second actuator between said extreme positions over an angular range possibly extending from 0° to 90°.

The first actuator and the second actuator are constituted in particular by servo-controls engaging with the proximal end of the control rod opposite from its distal end carrying the control plate. Such servo-controls may potentially be constituted equally well by rotary type servo-controls or by translation type servo-controls.

Preferably, the control plate is in rotary engagement with the hub via a hinged mechanism, such as a scissors linkage, a bellows, tangential links, or embedded pitch links, for example.

A method of using a tail rotor fitted to a rotorcraft in accordance with the present invention mainly comprises an operation of controlling the attitude of the rotorcraft in yaw, which is performed conventionally by collective variation of the pitch of the blades of the tail rotor. Said method also comprises subsidiary methods of using the thrust produced by the tail rotor by cyclically varying the pitch of the blades of the tail rotor, said cyclical variation being permanent.

Such subsidiary operations of making use of the thrust produced by the tail rotor serve respectively to provide a contribution to the lift and/or a contribution to the propulsion in translation of the rotorcraft under specific flying situations as identified by the on-board instrumentation of the rotorcraft.

More particularly, a method of using a tail rotor fitted to a rotorcraft of the present invention mainly comprises an operation of controlling the attitude of the rotorcraft in yaw, an operation of the tail rotor providing a controlled contribution to the lift of the rotorcraft, and an operation of the tail rotor providing a controlled contribution to the propulsion in translation of the rotorcraft.

Said operation of controlling the attitude of the rotorcraft in yaw comprises in particular the following steps:

the pilot of the rotorcraft issuing a command to vary the collective pitch of the blades of the tail rotor so as to control the yaw attitude of the rotorcraft;

transmitting said collective pitch variation command for the blades to the control means; and the control means activating the first actuator in compliance with the collective pitch variation command for the blades, thereby causing the control rod to move in translation.

Said operation of causing the tail rotor to provide a controlled contribution to the lift of the rotorcraft comprises in particular the following steps:

the pilot of the rotorcraft issuing a first flight command relating to a request for the tail rotor to provide a contribution to the lift of the rotorcraft;

transmitting said first flight command to the control means; and the control means activating the second actuator in compliance with said first flight command, causing the control rod to be turned towards said first extreme position.

Said operation of causing the tail rotor to provide a controlled contribution to propulsion in translation of the rotorcraft comprises the following steps:

the pilot of the rotorcraft issuing a second flight command relating to a request for the tail rotor to provide a contribution to the propulsion in translation of the rotorcraft;

transmitting the second flight command to the control means; and the control means activating the second actuator in compliance with said second flight command, causing the control rod to be turned towards said second extreme position.

The first flight command is advantageously generated by a pilot of the rotorcraft in response to at least one of the following items of information as provided by on-board instrumentation of the rotorcraft;

the forward speed of the rotorcraft, and more particularly the on-board instrumentation identifying that the rotorcraft is hovering and/or flying at low speeds;

the overall weight of the rotorcraft including at least the weight of its own structure and preferably the weight of its payload, or indeed the current weight of fuel on board; and conditions in which the center of gravity of the rotorcraft is offset towards the tail.

The second flight command is advantageously generated by a pilot of the rotorcraft on the basis of information delivered by the on-board instrumentation of the rotorcraft relating to progress of the rotorcraft at high speeds.

Naturally, the amplitude of the turning of the control rod is calculated by the control means so as to control the orientation of the thrust produced by the tail rotor depending on the respective amplitudes of the vertical thrust vector component and of the longitudinal thrust vector component that are to be delivered in compliance with said various flight commands issued by the pilot.

BRIEF DESCRIPTION OF THE SEVERAL VIEWS OF THE DRAWINGS

Embodiments of the present invention are described with reference to the figures of the accompanying sheets, in which:

FIG. 1 is made up of two diagrams (a) and (b) showing a rotorcraft having a tail rotor in which the rotor disk is arranged in a longitudinal-vertical orientation, the views being respectively a plan view for diagram (a) and a side view for diagram (b);

FIG. 2 is made up of two diagrams (c) and (d) showing a rotorcraft having a tail rotor in which the rotor disk is arranged in a transverse-vertical orientation, the views being respectively a plan view for diagram (c) and a side view for diagram (d);

FIG. 3 is made up of two diagrams (e) and (f) showing a rotorcraft having a tail rotor in which the rotor disk is arranged in a longitudinal-tilting orientation, the views being respectively a plan view for diagram (e) and a side view for diagram (f);

DETAILED DESCRIPTION OF THE INVENTION

Figure 4:
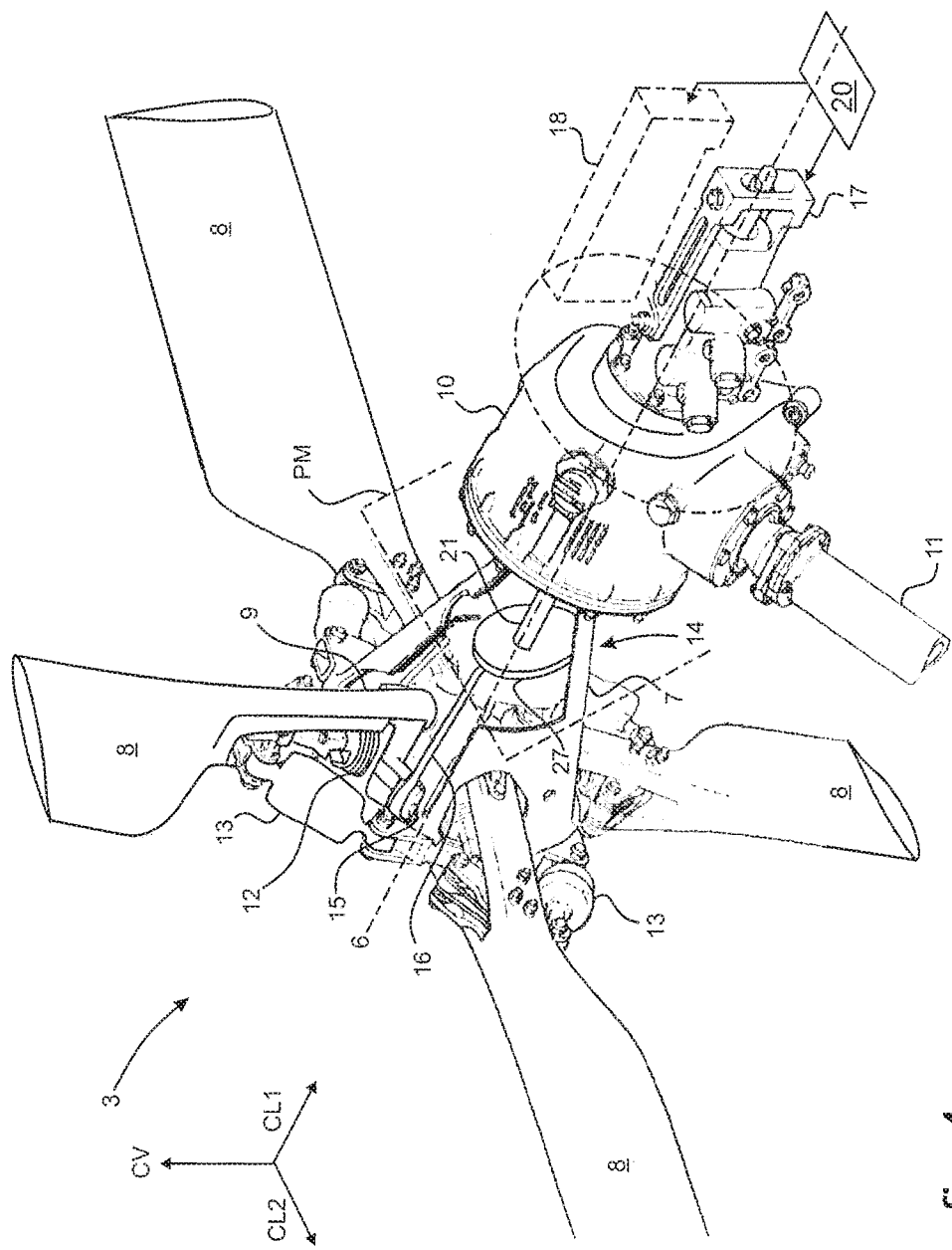
FIG. 4 is a perspective view of a rotorcraft tail rotor in an embodiment of the present invention.

Elements present in more than one of the figures are identified by the same reference numerals in each of them.

In FIGS. 1 to 3, a rotorcraft 1 has a main rotor 2 that is driven in rotation about a substantially vertical axis, and a tail rotor 3 that is driven in rotation about a substantially horizontal axis. The main rotor 2 provides the rotorcraft 1 at least with lift, and possibly also with propulsion and/or changes in attitude, while advancing in any direction. The tail rotor 3 is an anti-torque rotor mounted at the end of a tail boom 4 of the rotorcraft 1 in order to provide yaw attitude control for the rotorcraft 1.

Conventionally, a rotorcraft rotor comprises a rotary wing made up of at least two blades (four blades in the embodiments shown). The blades are mounted on a hub that is driven in rotation, a rotor disk 5 typically formed by the circle described by the tips of the blades of the rotary wing.

In FIG. 1, the drive axis 6 of the tail rotor 3 is mounted at the end of the tail boom 4 so as to be permanently oriented in a constant orientation that is substantially horizontal and orthogonal to the orientation of the vertical plane PV in which the rotorcraft 1 extends in the longitudinally-extending direction DL of the rotorcraft 1. The rotor disk 5 is thus arranged in a longitudinal-vertical orientation relative to the rotorcraft 1, with the rotor disk 5 being oriented vertically and longitudinally and being arranged on one side of the tail boom 4 of the rotorcraft 1.

These arrangements are such that the tail rotor 3 generates thrust essentially comprising a transverse thrust vector component CL1 providing attitude control for the rotorcraft 1 in yaw.

In FIG. 2, the drive axis 6 of the tail rotor 3 is oriented substantially horizontally, while being inclined relative to the orientation of the vertically-extending plane PV of the rotorcraft 1, i.e. extending in the longitudinally-extending direction PL of the rotorcraft 1. The rotor disk 5 is thus arranged in a vertical-transverse orientation relative to the rotorcraft 1 in which the rotor disk 5 is oriented vertically while being inclined relative to the longitudinally-extending direction DL of the rotorcraft 1.

These arrangements are such that the tail rotor 3 generates thrust having a transverse thrust vector component CL1 providing the rotorcraft 1 with yaw control. The thrust generated by the tail rotor 3 also includes a longitudinal thrust vector component CL2 providing the rotorcraft 1 with propulsion in translation along its longitudinally-extending plane.

Conventionally in the prior art, and as shown in FIG. 2, arranging the rotor disk 5 in a transverse-vertical orientation is done by inclining the drive axis 6 of the tail rotor 3 relative to the longitudinally-extending direction DL of the rotorcraft 1. Such an inclination may be imparted by swiveling the tail rotor 3 so as to modify the orientation of its drive axis 6.

In FIG. 3, the rotor disk 5 is arranged in a longitudinal-sloping orientation relative to the rotorcraft 1, in which the rotor disk 5 is arranged on one side of the tail boom 4 of the rotorcraft 1, being inclined relative to the orientation of the vertically-extending plane PV of the rotorcraft 1 and extending in the longitudinally-extending direction DL of the rotorcraft 1.

These arrangements are such that the tail rotor 3 generates thrust having a transverse thrust vector component CL1 serving to stabilize and/or guide the rotorcraft 1 in yaw, and a vertical thrust vector component CV providing contribution to the lift of the rotorcraft 1 in addition to the lift that is mainly provided by the main rotor 2. In order to provide said additional lift for the rotorcraft 1 using the tail rotor 3, such a vertical thrust vector component CV that is oriented in the vertically-extending direction of the rotorcraft 1 naturally itself includes in full or in part a thrust vector component that is oriented along the gravity axis.

Conventionally in the prior art, and as shown in FIG. 3, the arrangement of the rotor disk 5 in a longitudinal-sloping orientation is achieved by inclining the drive axis 6 of the tail rotor 3 in the vertical plane in question in the transversely-extending direction DT of the rotorcraft 1.

In FIG. 4, an anti-torque tail rotor 3 conventionally comprises a hub 7 having blades 8 mounted thereon via respective blade roots 9. The hub 7 is mounted on a structure 10 made up of a power transmission gearbox constituting an angle takeoff between a drive shaft 11 and the hub 7. The tail rotor 3 shown in FIG. 4 is mounted on the structure 10 so that its drive axis 6 is permanently oriented substantially orthogonally to the axis of rotation of the drive shaft 11, which extends along the tail boom of the rotorcraft.

In such a configuration and in accordance with the present invention, the tail rotor 3 is mounted at the end of the tail boom of the rotorcraft in such a manner that the drive axis 6 of the tail rotor 3 is permanently oriented along a constant orientation that is substantially horizontal and orthogonal to the vertical plane PV extending along the longitudinally-extending direction DL of the rotorcraft 1, and as shown in FIG. 1.

Conventionally, the blades 8 of the tail rotor 3 are collectively controllable to pivot about individual pitch-variation axes. By way of indication, the blades 8 are mounted on the hub 7, while also being mounted to be movable in a lead-lag direction and in a flapping direction. In this context, and in the embodiment shown, the blades 8 are mounted on the hub 7 via spherical laminated abutments 12, lead-lag dampers 13 being individually engaged with the blades 8 and the hub 7.

The blades 8 are controlled collectively to pivot about their respective pitch-variation axes by a control mechanism 14 in compliance with collective pitch variation commands generated by a pilot of the rotorcraft. Causing the blades 8 to pivot collectively about their pitch variation axes serves to control the amplitude of the thrust produced by the tail rotor 3.

For this purpose, each of the blades 8 is typically provided with a pitch lever 15 engaged with a control link 16 forming part of said control mechanism 14.

The control mechanism 14 has actuators 17, 18 constituted by servo-controls operated by control means 20 that are activated as a function of flight commands generated by the pilot.

A first actuator 17 is mounted on the structure 10 so as to be oriented along the drive axis 6 of the tail rotor 3. The first actuator 17 serves to move a control rod 21 of the control mechanism 14 in translation. A second actuator 18 is mounted on the structure 10 beside the control rod 21 and serves to pivot the control rod 21 about the drive axis 6 of the tail rotor 3.

Figure 5:
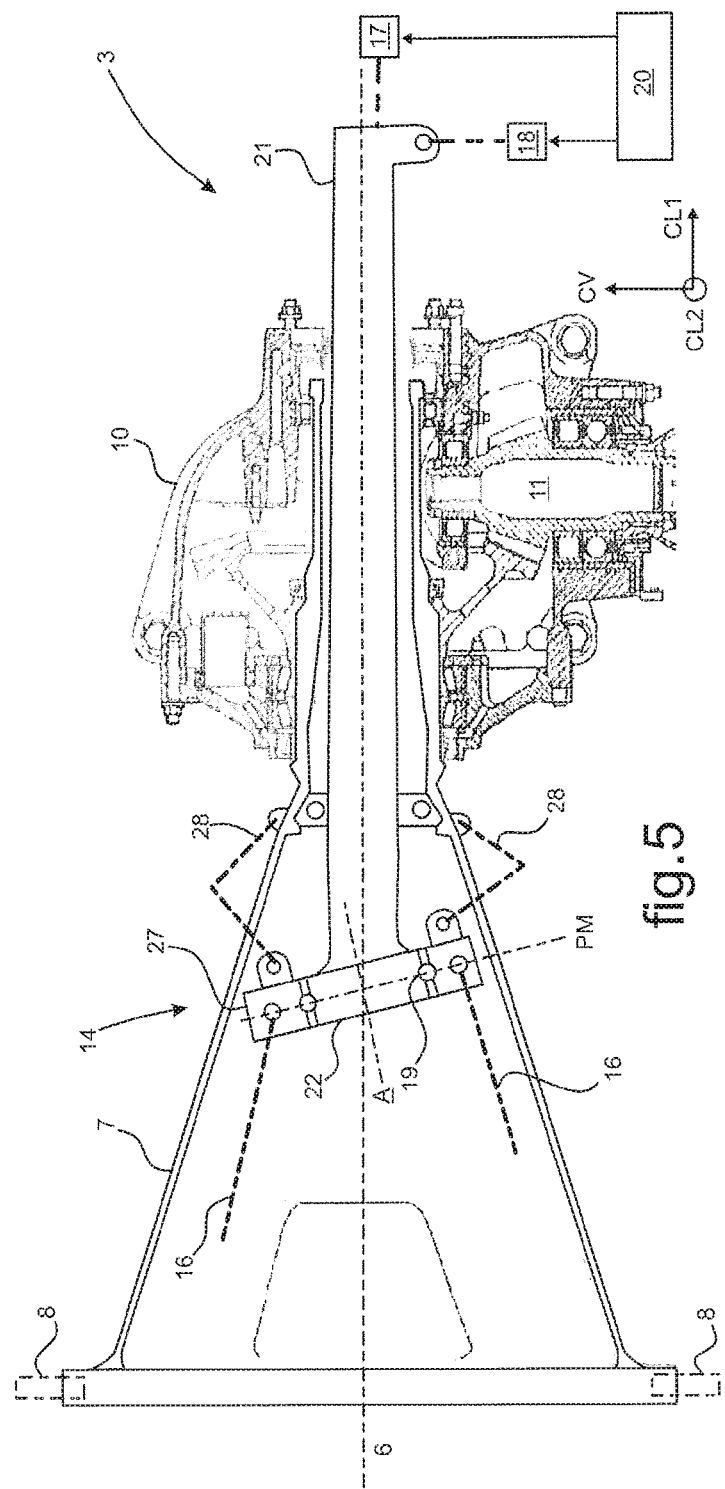
FIGS. 5 and 6 are diagrammatic views in axial section of a rotorcraft tail rotor in respective embodiments of the present invention.
Figure 6:
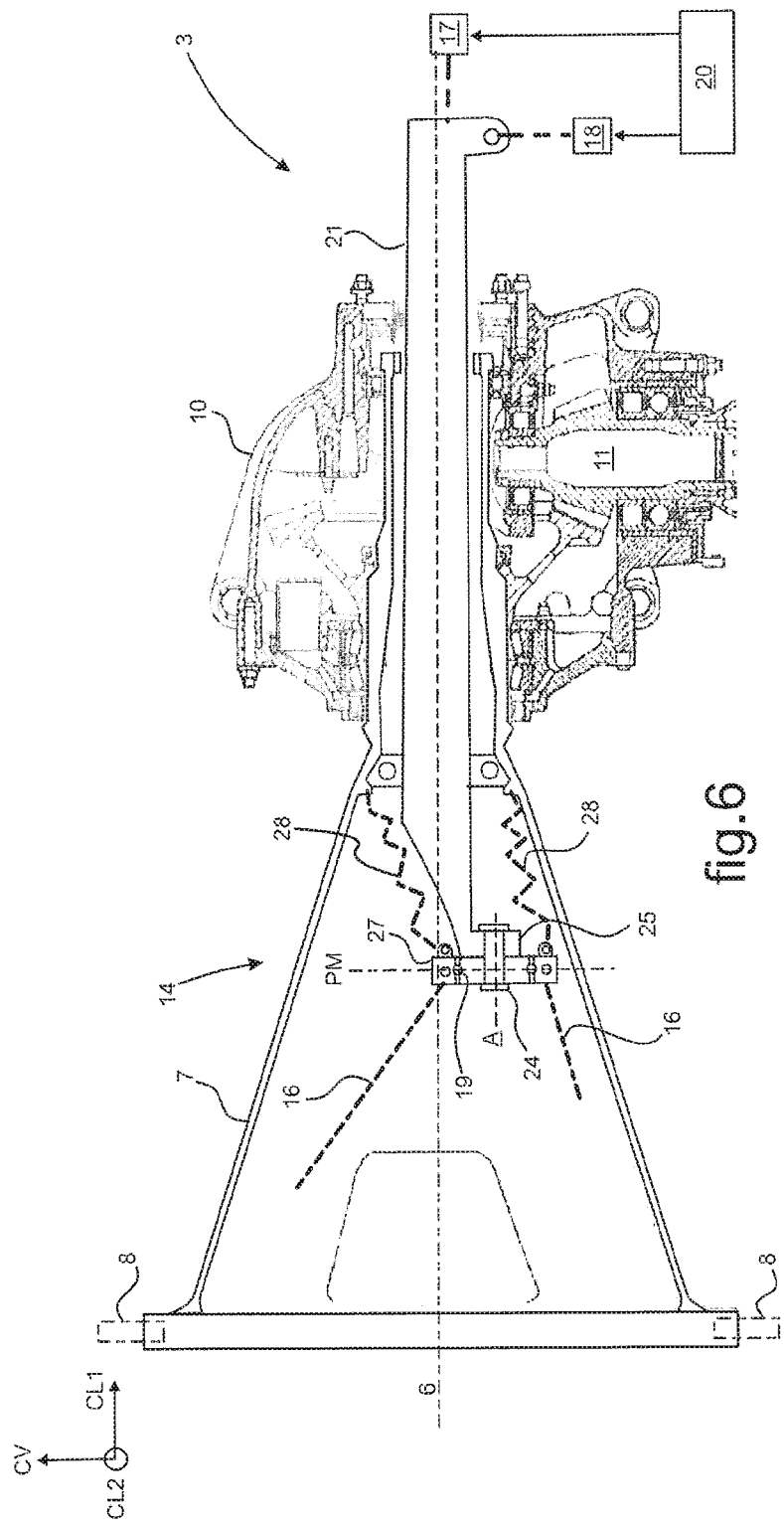

Variant embodiments of such a control mechanism 14 in the present invention are shown in FIGS. 5 and 6 respectively.

In FIGS. 5 and 6, the control mechanism 14 comprises a control rod 21 mounted coaxially in the structure 10 on the drive axis 6 of the tail rotor 3, extending inside the hub 7. The proximal end of the control rod 21 engages the actuators 17 and 18 and at its distal end it carries a control plate 27 via a rolling bearing member 19.

The control plate 27 is connected to each of the blades 8 of the tail rotor via said individual control links 16 of the blades 8 for pivoting the blades about their pitch variation axes. The control plate 27 is connected to the hub 7 via a hinged mechanism 28 so as to be driven in rotation by the hub 7. In FIG. 5, said hinged mechanism 28 is arranged as a linkage. In FIG. 6, said hinged mechanism 28 is arranged as a bellows made up of rigid elements that are hinged to one another.

It is proposed to cause the blades 8 of the tail rotor 3 to vary cyclically on a permanent basis in order to generate preferentially on a permanent basis at least one auxiliary thrust vector component CL2 and/or CV that is distinct from the transverse thrust vector component CL1 that is the main component generated by the tail rotor 3 for controlling the attitude in yaw of the rotorcraft.

Said auxiliary thrust vector component CL2 and/or CV is used selectively in differing flight situations in order to satisfy specific needs by providing the rotorcraft with additional lift or providing the rotorcraft with additional propulsion in translation in its horizontally-extending plane.

Nevertheless, such additional contributions to the rotorcraft of lift and/or propulsion in translation are useful under certain flight situations, but are of smaller importance than the main function of the tail rotor 3, which consists in providing the rotorcraft with yaw attitude control.

Consequently, it is desirable to avoid excessively complexifying the structure of the tail rotor 3, in particular by avoiding any member of the control mechanism 14 being mounted in nutation so as to limit adding weight to the tail boom of the rotorcraft and also so as to achieve costs that are competitive and so as to enable the tail rotor 3 to be installed easily on the tail boom of the rotorcraft.

To this end, the control plate 27 is rotatably mounted on the control rod 21, being oriented in its general plane lying on a mounting plane PM of orientation that is constant relative to the drive axis 6 of the tail rotor 3. The way the control plate 27 is mounted on the control rod 21 gives rise to advantageous permanent cyclical variation in the pitch of the blades 8 of the tail rotor 3.

By way of example, in FIG. 5, the control plate 27 is mounted on the control rod 21 by being arranged in a mounting plane PM that is inclined relative to the drive axis 6 of the tail rotor 3. The control plate 27 is mounted on a collar 22 of the control rod 21, said collar 22 being frontally inclined relative to a plane orthogonal to the drive axis 6 of the tail rotor 3.

By way of example, in FIG. 6, the control plate 27 is mounted on the control rod 21 so as to lie in a mounting plane PM that is orthogonal to the drive axis 6 of the tail rotor 3. In this configuration, the axis of rotation A of the control plate 27 is off-center relative to the drive axis 6 of the tail rotor 3.

In the embodiment shown in FIG. 6, the axis of rotation A of the rotary control plate 27 extends parallel to the drive axis 6 of the tail rotor 3 while being radially offset from the drive axis 6 of the tail rotor 3. For this purpose, the control plate 27 is mounted to rotate on a cylindrical finger 24 mounted on a radially extending lug 25 projecting from the control rod 21.

The control rod 21 is controllable by the actuators 17 and 18, such that respective activations of the actuators modify the effects produced by the thrust generated by the tail rotor 3.

More particularly, a first actuator 17 serves to move the control rod 21 in translation along the drive axis 6 of the tail rotor 3 for the purpose of collectively varying the pitch of the blades 8 of the tail rotor 3. A second actuator 18 serves to turn the control rod 21 coaxially around the drive axis 6 of the tail rotor 3.

The control rod 21 is turnable by the second actuator 18 between two predefined extreme positions moving the control plate 27 between respective angular orientations in the mounting plane PM. The control rod 21 moving the control plate 27 so as to modify its angular orientation is the result of the control plate 27 being engaged with the blades 8 and of the control plate 27 being in axial thrust engagement against the control rod 21 via the rolling bearing members 19.

In FIG. 5, moving the control plate 27 so as to modify its angular orientation in the mounting plane comprises the control plate 27 turning about the drive axis 6 of the tail rotor 3. In FIG. 6, the movement of the control plate 27 that modifies its angular orientation is an angular movement of the control plate 27 in the mounting plane PM.

In a first extreme position of the control rod 21, the control plate 27 is placed in a first extreme angular orientation in which said auxiliary thrust vector component is a vertical thrust vector component CV providing a contribution to the lift of the rotorcraft. In a second extreme position of the control rod 21, the control plate 27 is placed in a second extreme angular orientation in which said auxiliary vector thrust component is a longitudinal vector thrust component CL2 providing a contribution to the propulsion in translation of the rotorcraft.

Depending on the flight commands generated by a pilot of the rotorcraft, the control mechanism 14 for controlling the blades 8 of the tail rotor 3 adjusts the amplitude of the thrust generated by the tail rotor 3 and the distribution of this thrust between said main transverse thrust vector component CL1 that acts on a priority basis to control the yaw attitude of the rotorcraft 1, and said auxiliary thrust vector components CL2 and CV of amplitudes that vary inversely depending on the needs identified during predetermined flight situations of the rotorcraft.

Figure 7:
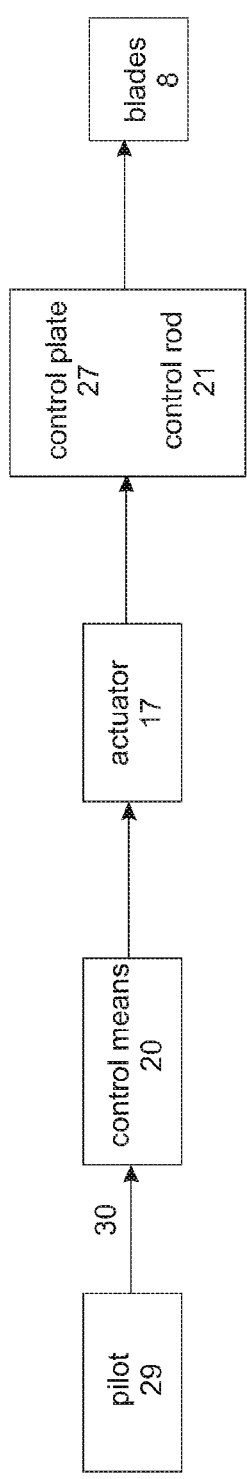
FIGS. 7, 8, and 9 are diagrams showing various operations in a method of using the tail rotors shown in FIGS. 4 to 6.

More particularly with reference to FIG. 7, a pilot 29 of the rotorcraft generates a collective pitch variation command 30 for the blades of the tail rotor in order to vary the amplitude of the thrust produced by the tail rotor.

The collective pitch variation command 30 for the blades is transmitted to the control means 20 that activate the first actuator 17, thereby having the effect of moving the control rod 21 in translation and consequently of moving the control plate 27 in translation. This operation has the effect of varying the pitch of the blades 8 collectively, and thus has the effect of varying the magnitude of the thrust produced by the tail rotor.

Figure 8:
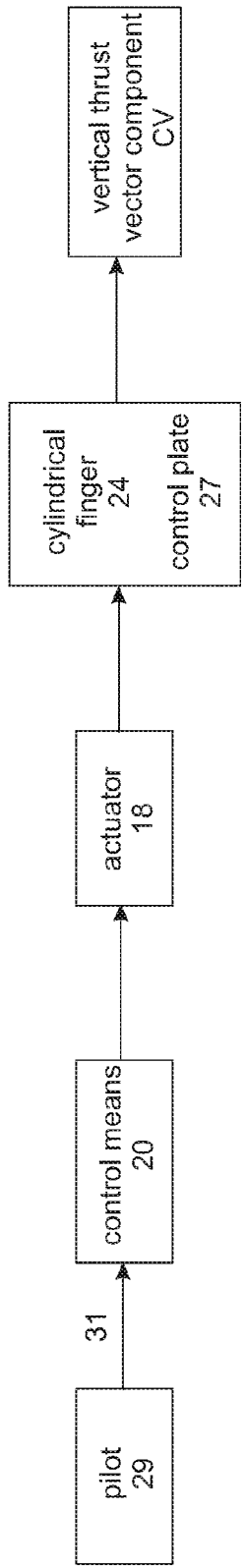

Still more particularly in FIG. 8, a pilot 29 of the rotorcraft generates a first flight command 31 to provide the rotorcraft with additional lift from the tail rotor. The first flight command 31 is transmitted to the control means 20 which activate the second actuator 18 to cause the control rod 21 to turn in a first direction towards the first extreme position so as to have the effect of modifying the angular orientation of the control plate 27. With the control plate 27 arranged in said first extreme angular orientation, a vertical thrust vector component CV is generated by the tail rotor.

Figure 9:
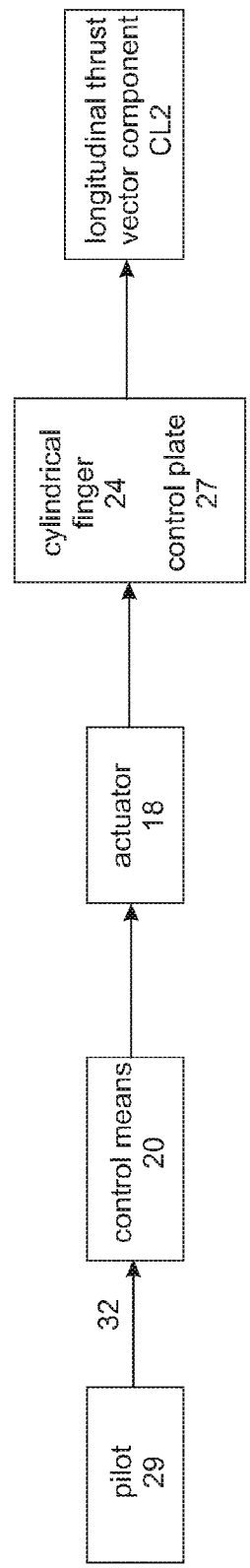

In FIG. 9, a pilot 29 of the rotorcraft generates a second flight command 32 constituting a request for the tail rotor 3 to provide the rotorcraft 1 with additional propulsion in translation. The second flight command 32 is transmitted to the control means 20, which activate the second actuator 18 to cause the control rod 21 to turn towards the second extreme position in a second direction of rotation opposite to the first direction of rotation. Consequently, the angular orientation of the control plate 27 is modified to cause the control plate 27 to move towards said second extreme angular orientation. With the control plate 27 arranged in said second extreme angular orientation, a longitudinal thrust vector component CL2 is generated by the tail rotor.

The orientation of the drive axis 6 of the tail rotor 3 is kept constant because of the fixed manner in which the tail rotor 3 is mounted on the tail boom 4 of the rotorcraft 1, and any contributions to the lift and/or the propulsion in translation of the rotorcraft as provided by the tail rotor 3 are obtained by varying the orientation of the control plate 27 and consequently by varying the orientation of the rotor disk 5 between said longitudinal-sloping orientation and said transverse-vertical orientation.

The respective amplitudes of the vertical thrust vector component CV and/or of the longitudinal thrust vector component CL2 produced by the tail rotor 3 are generated selectively and/or in regulated manner by varying the collective pitch of the blades so as to modify the amplitude of the thrust generated by the tail rotor 3 and/or by varying the angular orientation of the control plate 27 in said mounting plane PM, thereby causing the orientation of the rotor disk 5 to vary.

What is claimed is:

1. A rotorcraft fitted with at least one main rotor of substantially vertical rotary drive axis, and with an anti-torque tail rotor of substantially horizontal rotary drive axis, said tail rotor being mounted at the end of a tail boom of the rotorcraft via a structure housing mechanical power transmission means between a hub of the tail rotor and a drive shaft of orientation that is transverse relative to said drive axis of the tail rotor;

the drive axis of the tail rotor being arranged at a constant orientation that is substantially horizontal and orthogonal to the orientation of the vertical plane (PV) extending in the longitudinally-extending orientation (DL) of the rotorcraft such that the rotor disk constituted by the rotary wing of the tail rotor is arranged mainly in a longitudinal-vertical orientation, serving essentially to generate a transverse thrust vector component (CL1) for controlling the yaw behavior of the rotorcraft;

said hub carrying said rotary wing made up of a plurality of blades individually mounted to be movable on the hub at least in pivoting about a pitch variation axis, the tail rotor being fitted with a control mechanism for pivoting the blades about their said pitch variation axes in compliance with pitch variation commands generated by a pilot of the rotorcraft;

said control mechanism comprising a control plate rotatably engaged with the hub, the control plate being provided with control links for controlling the blades, the control links being engaged respectively with pitch levers individually fitted to the blades, the control plate being mounted to rotate on a control rod mounted coaxially about the drive axis of the tail rotor and being movable in translation along said axis by a first actuator operated under the control of control means in compliance with said pitch variation commands;

operation of the first actuator by the control means causing collective variation of the pitch of the blades of the tail rotor, thereby modifying the amplitude of the thrust generated by the tail rotor, the control mechanism further including means for generating cyclical variation in the pitch of the blades of the tail rotor;

wherein:
the control plate is mounted on the control rod to generate permanent cyclical variation in the pitch of the blades of the tail rotor, the control plate being arranged with its general plane lying in a mounting plane (PM) of orientation that is constant relative to the drive axis of the tail rotor; and
the control rod is turnable about the drive axis of the tail rotor by a second actuator operated under the control of the control means, the second actuator causing the control rod to turn between two predefined extreme positions causing a change in the angular orientation of the control plate in said mounting plane (PM), and consequently modifying the orientation of said rotor disk;

whereby:
the second actuator causing the control rod to turn towards a first extreme position causes the control plate to move in the mounting plane (PM) towards a first extreme angular orientation in which the permanent cyclical variation in the pitch of the blades of the tail rotor serves mainly to generate a thrust vector component (CV) that is vertical; and
the second actuator turning the control rod towards a second extreme position causes the control plate to move in the mounting plane (PM) towards a second extreme angular orientation in which the permanent cyclical variation in the pitch of the blades of the tail rotor serves mainly to generate a thrust vector component (CL2) that is longitudinal.

2. A rotorcraft according to claim 1, wherein the control plate is mounted on the axis of the control rod, being arranged in a mounting plane (PM) that is oriented orthogonally relative to the transversely-extending vertical plane of the rotorcraft and that is inclined relative to the drive axis of the tail rotor, the control plate being movable between said extreme angular positions by being turned about the drive axis of the tail rotor.

3. A rotorcraft according to claim 2, wherein the angle of inclination of the control plate relative to the drive axis of the tail rotor lies in the range 10° to 30°.

4. A rotorcraft according to claim 2, wherein the control plate is mounted via at least one rolling bearing member on a collar of the control rod, which collar is inclined to occupy the mounting plane (PM) of the control plate.

5. A rotorcraft according to claim 1, wherein the control plate is mounted on the control rod by being arranged in a mounting plane (PM) that is orthogonal to the drive axis of the tail rotor, the axis of rotation (A) of the control plate being parallel to the drive axis of the tail rotor and being offset therefrom, the control plate being movable between said extreme angular orientations by angularly moving the control plate in said mounting plane (PM) about the drive axis of the tail rotor.

6. A rotorcraft according to claim 5, wherein the control plate is mounted via at least one rolling bearing member on a cylindrical finger carried radially at a distance from the drive axis of the tail rotor by means of a lug extending radially from the control rod.

7. A rotorcraft according to claim 1, wherein the control rod is turnable by the second actuator between said extreme positions over an angular range extending from 0° to 90°.

8. A rotorcraft according to claim 1, wherein the control plate is in rotary engagement with the hub via a hinged mechanism.

9. A method of operating a tail rotor of a rotorcraft according to claim 1, wherein an operation of controlling the attitude of the rotorcraft in yaw comprises the following steps:
the pilot of the rotorcraft issuing a command to vary the collective pitch of the blades so as to control the yaw attitude of the rotorcraft;
transmitting said collective pitch variation command for the blades to the control means; and
the control means activating the first actuator in compliance with said collective pitch variation command for the blades, thereby causing the control rod to move in translation;
wherein an operation of causing the tail rotor to provide a controlled contribution to the lift of the rotorcraft comprises the following steps:
the pilot of the rotorcraft issuing a first flight command relating to a request for the tail rotor to provide a contribution to the lift of the rotorcraft;
transmitting the first flight command to the control means; and
the control means activating the second actuator in compliance with said first flight command, causing the control rod to be turned towards said first extreme position; and wherein an operation of causing the tail rotor to provide a controlled contribution to propulsion in translation of the rotorcraft comprises the following steps:

the pilot of the rotorcraft issuing a second flight command relating to a request for the tail rotor to provide a contribution to the propulsion in translation of the rotorcraft;

transmitting the second flight command to the control means; and the control means activating the second actuator causing the control rod to be turned towards said second extreme position.

10. A method according to claim 9, wherein said first flight command is generated by a pilot of the rotorcraft in response to at least one of the following items of information as provided by on-board instrumentation of the rotorcraft;

the forward speed of the rotorcraft while hovering and/or flying at low speeds;

the overall weight of the rotorcraft including at least the weight of its own structure and the weight of its payload; and conditions in which the center of gravity of the rotorcraft is offset towards the tail.

11. A method according to claim 9, wherein the second flight command is generated by a pilot of the rotorcraft on the basis of information delivered by the on-board instrumentation of the rotorcraft relating to progress of the rotorcraft at high speeds.

* * * * *